(12) United States Patent
Okada et al.

(10) Patent No.: US 11,616,261 B2
(45) Date of Patent: Mar. 28, 2023

(54) POWER SUPPLY DEVICE (71) Applicant: SANYO Electric Co., Ltd., Daito (JP)

(72) Inventors: Wataru Okada, Hyogo (JP); Kosho Abe, Hyogo (JP); Yusuke Fujii, Hyogo (JP); Takeshi Nagane, Miyagi (JP); Sho Ojima, Miyagi (JP)

(73) Assignee: SANYO Electric Co., Ltd., Daito (JP)

( * ) Notice: Subject to any disclaimer, the term of this patent is extended or adjusted under 35 U.S.C. 154(b) by 694 days.

(21) Appl. No.: 16/325,039

(22) PCT Filed: May 9, 2017

(86) PCT No.: PCT/JP2017/017452
§ 371 (c)(1),
(2) Date: Feb. 12, 2019

(87) PCT Pub. No.: WO2018/042763
PCT Pub. Date: Mar. 8, 2018

(65) Prior Publication Data
US 2021/0288363 A1 Sep. 16, 2021

(30) Foreign Application Priority Data

Aug. 29, 2016 (JP) .............................. JP2016-167394

(51) Int. Cl.
*H01M 10/6554* (2014.01)
*H01M 10/613* (2014.01)
(Continued)

(52) U.S. Cl.
CPC ..... *H01M 10/6554* (2015.04); *H01M 10/613* (2015.04); *H01M 10/625* (2015.04);
(Continued)

(58) Field of Classification Search
CPC .......................... H01M 50/289; H01M 50/291
See application file for complete search history.

(56) References Cited

U.S. PATENT DOCUMENTS

2008/0160395 A1* 7/2008 Okada .................... B60L 50/64
429/99
2010/0190050 A1 7/2010 Ochi
(Continued)

FOREIGN PATENT DOCUMENTS

CN 101789517 A 7/2010
JP 2008-166191 A 7/2008
(Continued)

OTHER PUBLICATIONS

International Search Report dated Jun. 13, 2017, issued in counterpart application No. PCT/JP2017/017452 (2 pages).
(Continued)

*Primary Examiner* — Amanda J Barrow
(74) *Attorney, Agent, or Firm* — WHDA, LLP (57) ABSTRACT

A power supply device includes battery cells each having a rectangular external shape, a separator disposed between the battery cells, a pair of end plates that are disposed on respective ends of a battery assembly in which the separator and the battery cells are stacked, and a bind bar that binds the pair of end plates. The separator has insulating rib parts that protrude from both surfaces of the separator, and the insulating rib parts of the separator stacked on each surface of the battery cell are stacked on each other on a bottom surface of the battery cell. The insulating rib parts are stacked on each other on the bottom surface of the battery cell by inserting an insertion rib provided in one of the stacked insulating rib parts into an insertion groove provided in the other of the stacked insulating rib parts.

11 Claims, 9 Drawing Sheets

(51) Int. Cl.
- *H01M 10/625* (2014.01)
- *H01M 10/647* (2014.01)
- *H01M 10/6563* (2014.01)
- *H01M 50/24* (2021.01)
- *H01M 50/209* (2021.01)

(52) U.S. Cl.
CPC ..... *H01M 10/647* (2015.04); *H01M 10/6563* (2015.04); *H01M 50/209* (2021.01); *H01M 50/24* (2021.01); *H01M 2220/20* (2013.01)

(56) References Cited

U.S. PATENT DOCUMENTS

| | | | |
|---|---|---|---|
| 2011/0236740 A1* | 9/2011 | Paolazzi | H01M 10/613 429/151 |
| 2013/0034764 A1 | 2/2013 | Ochi et al. | |
| 2014/0220391 A1* | 8/2014 | Fujii | H01M 50/20 429/7 |
| 2014/0302378 A1* | 10/2014 | Tsuruta | H01M 50/24 429/186 |
| 2015/0111097 A1* | 4/2015 | Park | H01M 4/485 429/188 |
| 2015/0270514 A1* | 9/2015 | Baek | H01M 50/264 429/151 |
| 2016/0036105 A1* | 2/2016 | Toshioka | H01M 10/613 429/120 |
| 2016/0141737 A1* | 5/2016 | Kubota | H01M 50/209 429/120 |
| 2017/0187080 A1* | 6/2017 | Choi | H01M 10/6551 |
| 2017/0352850 A1 | 12/2017 | Nagane et al. | |
| 2018/0019454 A1* | 1/2018 | Okada | B60L 58/26 |
| 2018/0123199 A1 | 5/2018 | Kubota et al. | |

FOREIGN PATENT DOCUMENTS

| | | | |
|---|---|---|---|
| JP | 2010-287550 A | 12/2010 | |
| JP | 2012-256465 | * 12/2012 | ............. H01M 2/10 |
| JP | 2013-33668 A | 2/2013 | |
| JP | 2013-251124 A | 12/2013 | |
| JP | 2014-238928 A | 12/2014 | |
| JP | 2016-31901 A | 3/2016 | |
| JP | 2016-119259 A | 6/2016 | |
| WO | 2016/084272 A1 | 6/2016 | |
| WO | 2016/104013 A1 | 6/2016 | |
| WO | WO 2016/104013 | * 6/2016 | ............. H01M 2/10 |

OTHER PUBLICATIONS

English translation of Chinese Office Action dated Mar. 22, 2021, issued in counterpart CN application No. 201780050897.0. (2 pages).

* cited by examiner

POWER SUPPLY DEVICE

TECHNICAL FIELD

The present invention relates to a power supply device in which a plurality of battery cells are stacked with a separator interposed therebetween.

BACKGROUND ART

A power supply device including a plurality of battery cells is used, for example, for a power supply for driving a vehicle. Such a power supply device includes a plurality of battery cells, a plurality of separators, a pair of bind bars, and a pair of end plates. Each of the separators is disposed between adjacent battery cells so as to insulate the adjacent battery cells from each other. The plurality of battery cells and the plurality of separators are stacked in an alternating fashion to form a battery assembly. The end plates are disposed on both respective end surfaces of the battery assembly in a stacking direction in which the battery cells are stacked. The battery cells are connected by the end plates disposed on the respective end surfaces so as to be fixed in a stacked state. Each of the battery cells is configured such that positive and negative electrode plates and an electrolyte are sealed in an exterior can made of a metal, and therefore the exterior can has a potential. It is therefore necessary to insulate a surface of the exterior can in order to prevent electrical leakage caused by dew condensation water of an adjacent battery cell. For example, condensed water droplets flow toward bottom surfaces of the battery cells, and therefore the bottom surfaces of the exterior cans need to be insulated from each other. Furthermore, the stacked battery cells are connected by the bind bars that are metal plates so that the battery assembly is maintained in a bound state, and the bind bars made of a metal and the battery cells need also be insulated from each other.

As such an insulating structure, a configuration in which a surface of an exterior can is covered with an insulating sheet formed from a resin such as polyethylene terephthalate (PET) is known, for example (see PTL 1 and PTL 2, for example). Specifically, a shrink tube that can cover a surface of an exterior can in close contact therewith due to heat shrinkage is used as such an insulating sheet. However, in such a configuration in which an exterior can is covered with an insulating sheet, each battery cell need be covered with the insulating sheet in advance. Therefore, this configuration entails problems of poor workability and rise in production cost. Furthermore, even in a case where a battery cell is configured such that a surface of an exterior can is insulated by an insulating sheet, the insulating sheet is sometimes broken. For this reason, sufficient safety cannot be sometimes secured in the case where the surface of the exterior can is insulated by the insulating sheet only.

A structure in which a separator made of plastic is molded integrally with an insulating rib part that covers a bottom surface of a battery cell has been developed in order to improve insulation of the bottom surface of the battery cell. (See PTL 3)

CITATION LIST

Patent Literature

PTL 1: Unexamined Japanese Patent Publication No. 2013-033668
PTL 2: Unexamined Japanese Patent Publication No. 2008-166191
PTL 3: Unexamined Japanese Patent Publication No. 2010-287550

SUMMARY OF THE INVENTION

Figure 9:
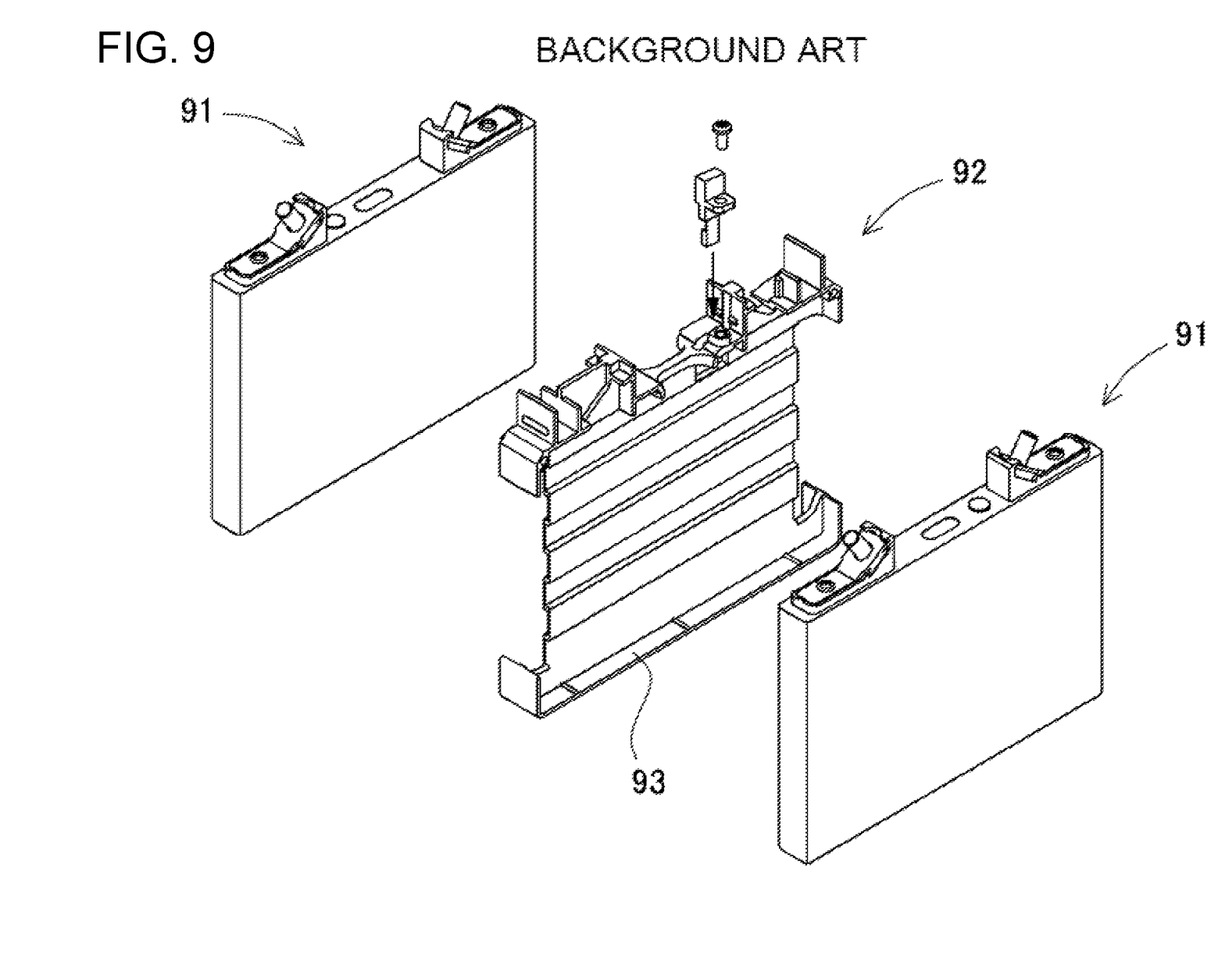
FIG. 9 is an exploded perspective view of a conventional power supply device.

In the power supply device of PTL 3, insulating rib part 93 that covers a bottom surface of battery cell 91 is provided along a bottom edge of separator 92 so as to protrude toward both sides of separator 92 as illustrated in the exploded perspective view of FIG. 9. A battery assembly in which separator 92 is disposed between battery cells 91 has improved insulation of the bottom surface because of insulating rib part 93. However, this battery assembly has a disadvantage that electrical leakage cannot be effectively prevented due to a short creepage distance on a bottom surface of battery cell 91 because dew condensation water enters a joint line between insulating rib parts 93 of the separator disposed on each side of battery cell 91. The power supply device is configured such that a bind bar made of a metal, an exterior case, a cooling plate, and the like are disposed below the insulating rib part of the separator. Therefore, in a case where dew condensation water enters a gap in the joint line, electrical leakage undesirably cannot be effectively prevented because of a short creepage distance. Especially in a power supply device in which a battery cell is cooled by forcibly blowing cooling air to a surface of the battery cell, moisture contained in the cooling air forms condensation on a surface of an exterior can of the low-temperature battery cell, and as a result, electrical leakage undesirably tends to occur. Furthermore, in a case where a surface of a battery cell is not covered with an insulating sheet, dew condensation water on the surface undesirably causes electrical leakage. Furthermore, in a case where an insulating sheet on a surface of a battery cell is locally broken, dew condensation water attached onto the surface undesirably causes electrical leakage.

The present invention has been accomplished to solve the above problems. A main object of the present invention is to provide a power supply device that can effectively prevent electrical leakage caused, for example, by dew condensation water by prolonging a creepage distance on a bottom surface of a battery cell with an extremely simple structure.

In order to attain the above object, a power supply device according to the present invention has the following configuration. The power supply device includes a plurality of battery cells each having a rectangular outer shape thinner than a width of a main surface; a separator that is disposed between the battery cells and is a molded member made of an insulating material; a pair of end plates that are disposed on respective ends of a battery assembly in which the battery cells insulated by the separator are stacked so that the main surfaces face each other; and a bind bar that binds the pair of end plates, wherein the separator has insulating rib parts that protrude from both surfaces of the separator so as to be disposed on the bottom surfaces of the battery cells stacked on both sides of the separator, and wherein the insulating rib parts of separator stacked on each surface of the battery cell are stacked on each other on the bottom surface of the battery cell. One of stacked the insulating rib parts has an insertion groove, the other of the stacked insulating rib parts has an insertion rib to be inserted into the insertion groove, and the insulating rib parts are stacked on each other on the bottom surface of the battery cell by inserting the insertion rib into the insertion groove so that a creepage distance is U-curved.

The power supply device can effectively prevent electrical leakage caused, for example, by dew condensation water by prolonging a creepage distance on a bottom surface of a battery cell with an extremely simple structure. This is because the power supply device is configured such that insulating rib parts of separators stacked on each side of a battery cell are stacked on each other on a bottom surface of the battery cell and a creepage distance on the bottom surface of the battery cell is prolonged by the insulating rib parts stacked in multiple layers. In particular, the above power supply device can more effectively prevent electrical leakage caused by condensation water and achieve extremely high safety since one of the stacked insulating rib parts has an insertion groove, the other of the stacked insulating rib parts has an insertion rib to be inserted into the insertion groove, and the insulating rib parts are stacked in multiple layers by inserting the insertion rib into the insertion groove. This is because the creepage distance can be further prolonged by inserting the insertion rib into the insertion groove and thereby making the creepage distance U-curved. Furthermore, by inserting the insertion rib into the insertion groove, a gap between the insertion groove and the insertion rib can be narrowed, and the narrow gap can be maintained. It is therefore possible to make a thickness of dew condensation water entering the gap between the insertion groove and the insertion rib thin and further include electrical leakage resistance.

In a conventional power supply device, a bottom surface of an exterior can of a battery cell is insulated by coating a surface of the exterior can with a heat shrinkable tube in order to insulate the exterior can. Meanwhile, the insulating structure using the stacked insulating rib parts of the present invention can be made thicker than the heat shrinkable tube, a creepage distance can be markedly prolonged by the stacked structure, and a strong insulating structure can be realized by the insulating rib parts provided in the separator. It is therefore possible to markedly inhibit a decrease in insulation properties caused by dew condensation water attached onto a surface of the exterior can and flowing to a bottom surface, as compared with a heat shrinkable tube. In particular, a creepage distance can be markedly prolonged with a unique structure in which insulating rib parts are stacked in multiple layers, and therefore a decrease in insulation resistance can be reduced by the long creepage distance even if dew condensation water flows down and enters a gap between the stacked insulating rib parts. Because of the good insulation properties, the power supply device according to the present invention can realize good insulation properties by using a battery cell in which a surface of an exterior can is not insulated by a heat shrinkable tube and can effectively suppress a decrease in insulation resistance caused by dew condensation water. Therefore, the power supply device that uses a battery cell in which a heat shrinkable tube is not used can be safely used even under a bad external condition in which dew condensation water tends to occur. The battery cell in which a heat shrinkable tube is not used can be produced at low cost in large quantities since both a material cost and a production cost are reduced. Therefore, a power supply device produced by using this battery cell can achieve good insulation properties while reducing whole cost. This is because a separator that has an insulating rib parts on both sides can be produced at low cost in large quantities by integral molding of plastic.

A power supply device in which a large number of battery cells are stacked to constitute a battery assembly is often mounted on a vehicle and used as a power supply for supplying power to a driving motor. The power supply device for this use is used in an extremely wide temperature range and used even under an extremely bad external condition. Furthermore, the power supply device is used even under a strict environment in which use restriction caused by electrical leakage threatens life. For these reasons, it is especially important that the power supply device can be safely used even under a strict environment by making use restriction caused by electrical leakage less likely. Furthermore, the power supply device for this use cannot eliminate dew condensation of water in air since a gap for cooling is provided on a surface of a battery in order to keep a battery temperature constant and the battery surface makes contact with air. Dew condensation water attached onto the surface is electrically conductive and therefore causes electrical leakage. In particular, dew condensation water attached onto the surface of the exterior can flows down to a bottom surface and causes electrical leakage on the bottom surface.

The above power supply device, in which insulating rib parts are stacked on each other on a bottom surface of a battery cell, effectively prevents electrical leakage from occurring in this part. In particular, electrical leakage is prevented since an insertion rib is inserted into an insertion groove so that a creepage distance becomes U-curved and long. Therefore, even if dew condensation water flows down onto a bottom surface of a battery and makes contact with metal bind bar or case disposed below the battery, the dew condensation water makes contact with the metal bind bar and the like over the long creepage distance. This can increase insulation resistance Therefore, even if electrical leakage occurs due to dew condensation water, negative effects caused by electrical leakage can be markedly reduced.

The power supply device according to the present invention can be configured such that the bind bar is a metal plate, and the bind bar made of a metal has a horizontal plate part disposed on lower surfaces of the insulating rib parts; and an insulating sheet is disposed between the horizontal plate part and the insulating rib parts, and the insulating sheet insulates the horizontal plate part made of the metal and the insulating rib parts from each other.

The above power supply device can more effectively insulate bottom surfaces of battery cells and further reduce a decrease in insulation resistance caused by dew condensation water. This is because insulation properties are improved by stacked insulating rib parts and the insulating rib parts and a horizontal plate part of a bind bar made of a metal are insulated from each other by an insulating sheet.

The power supply device according to the present invention can be configured such that the bind bar has a side surface plate part that is connected to horizontal plate part and is disposed on a side surface of battery cell; and a continuous insulating sheet can be disposed at least on a surface of a bottom part of the side surface plate part and a surface of the horizontal plate part.

The above power supply device can more effectively insulate a battery cell side surface and a metal bind bar from each other by using an insulating sheet.

The power supply device according to the present invention can be configured such that the separator has position determining ribs that protrude from a surface of the separator so as to make contact with side surfaces of the battery cell and place the battery cell at a fixed position; and the position determining ribs each have an upper surface that is inclined downward from an outer periphery of the battery cell toward a central part.

The power supply device allows dew condensation water to smoothly flow down and be discharged without remaining on an upper surface of a position determining rib.

The power supply device according to the present invention can be configured such that the bind bar is a metal plate, and the bind bar has a horizontal plate part disposed on lower surfaces of the insulating rib parts; the insulating rib parts are disposed between the horizontal plate part of the bind bar and a bottom surface of the battery cell and are disposed at respective ends of a lower part of the separator; the separator has, between the insulating rib parts on respective sides provided at respective ends of a bottom edge, a position determining rib that protrudes from a surface of the separator so as to make contact with a bottom surface of the battery cell and place the battery cell at a fixed position; and a water discharge gap can be provided between the insulating rib parts and the position determining rib.

The power supply device can promptly discharge dew condensation water flowing down to a bottom part of a battery cell through a water discharge gap provided between an insulating rib part and a position determining rib. This prevents dew condensation water from accumulating in the bottom part and decreasing insulation properties, thereby preventing a decrease in insulation properties caused by dew condensation water with more certainty.

The power supply device according to the present invention can be configured such that the separator has a plurality of position determining ribs between the insulating rib parts disposed at the respective ends of a bottom part, and the water discharge gap can be provided between the position determining ribs.

The above power supply device allows a battery cell to be accurately placed at a fixed position due to a plurality of position determining ribs and allows dew condensation water flowing down to a bottom part of the battery cell to be promptly discharged through a water discharge gap provided between the plurality of position determining ribs. This prevents dew condensation water from accumulating in the bottom part and decreasing insulation properties, thereby preventing a decrease in insulation properties caused by dew condensation water with more certainty.

The power supply device according to the present invention can be configured such that the separator has a position determining rib that makes contact with an outer peripheral surface of the battery cell and places the battery cell at a fixed position; and a deformed rib that is deformed by being pressed against the outer peripheral surface of battery cell can be provided on a contact surface of the position determining rib with the outer peripheral surface of the battery cell.

The power supply device allows a battery cell having a dimensional error to be accurately placed at a fixed position without looseness by causing position determining ribs to make contact with an outer peripheral surface of the battery cell. In the power supply device in which the battery cell can be accurately placed at a fixed position, a bus bar that is a thick metal plate can be fixed to an electrode terminal of the battery cell with ease. In a structure in which a bus bar that is a metal plate is laser-welded to the electrode terminal of the battery cell, the bus bar can be stably laser-welded while relative displacement between the electrode terminal and the bus bar is reduced.

The power supply device of the present invention can be configured such that an air path is provided between the separator and the battery cell.

The power supply device of the present invention can be configured such that the battery cells each have an exterior can made of a metal, and the separator can be disposed between the battery cells in which a surface metal of the exterior can is exposed.

DESCRIPTION OF EMBODIMENT

Figure 1:
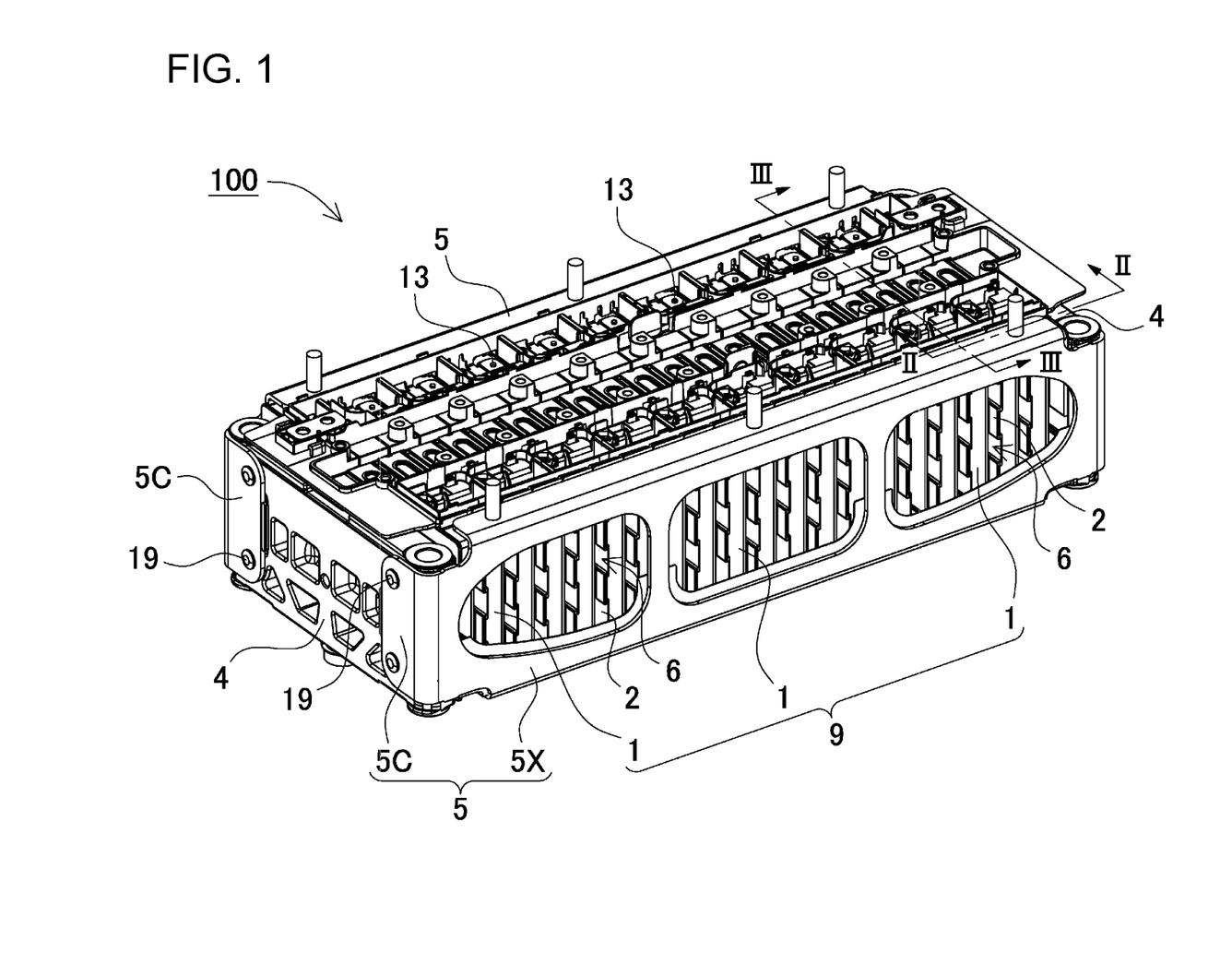
FIG. 1 is a perspective view of a power supply device according to an exemplary embodiment of the present invention.
Figure 2:
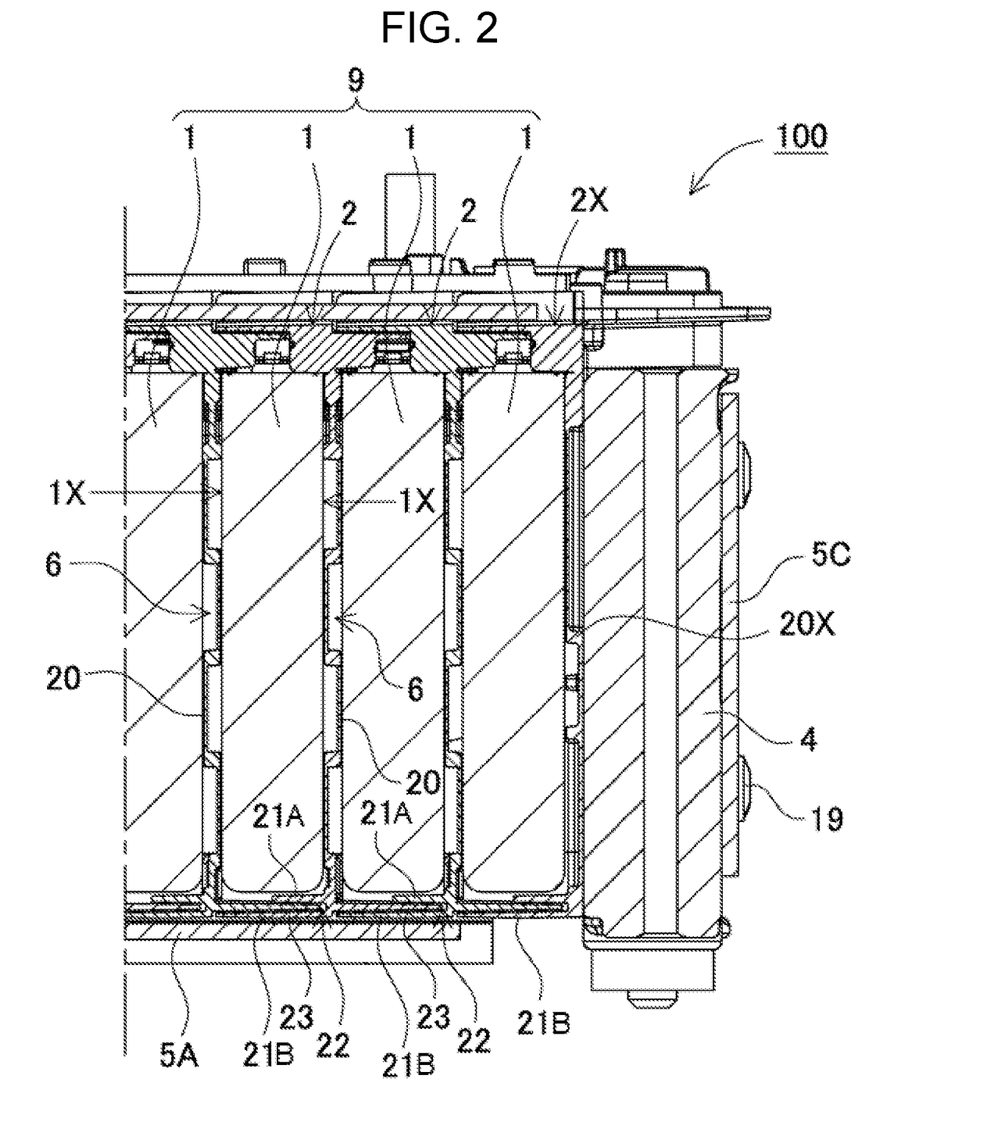
FIG. 2 is a cross-sectional view of the power supply device illustrated in FIG. 1 taken along line II-II.
Figure 3:
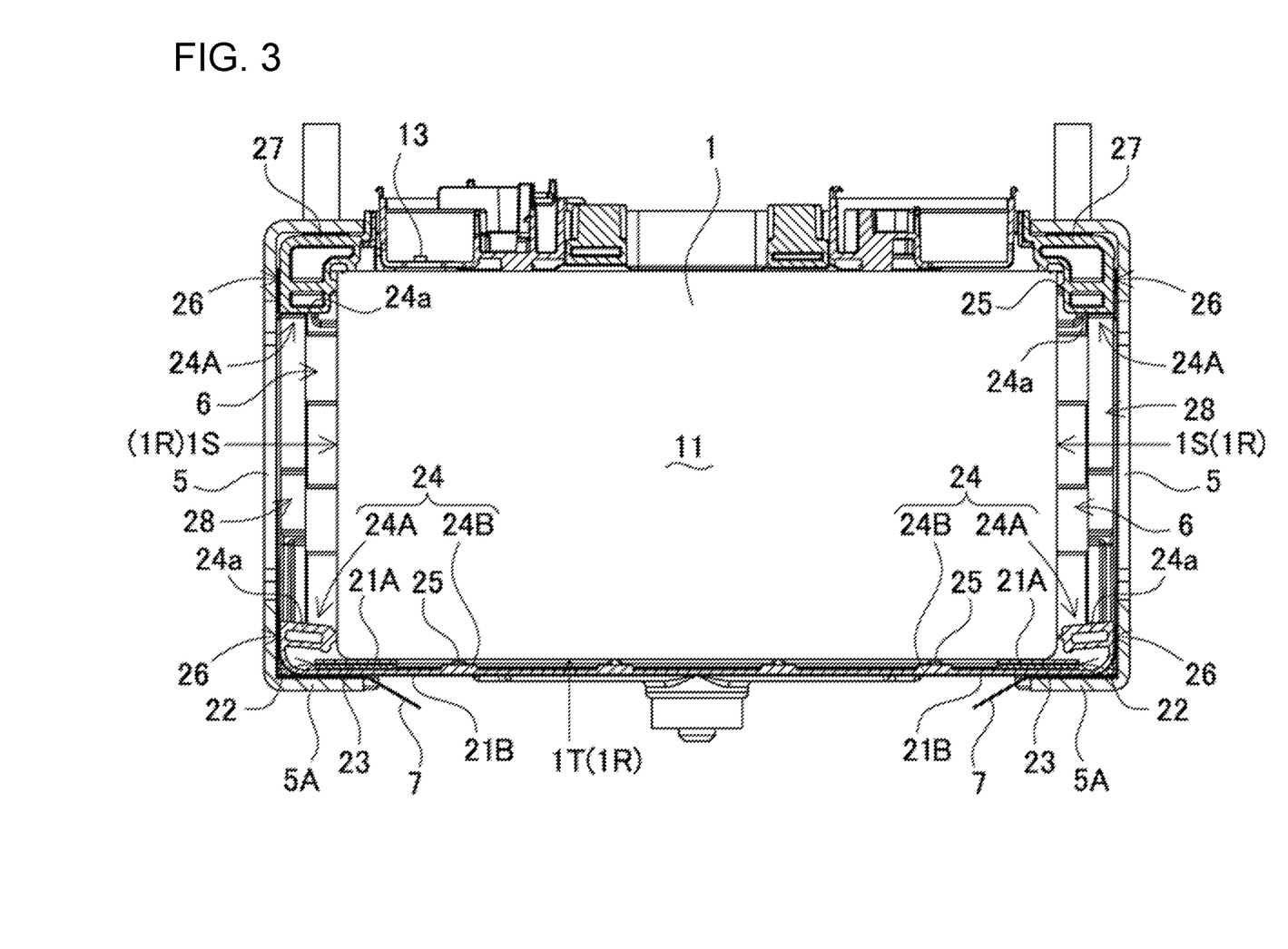
FIG. 3 is a cross-sectional view of the power supply device illustrated in FIG. 1 taken along line III-III.

A power supply device according to an exemplary embodiment of the present invention is illustrated in FIGS. 1 to 3. Power supply device 100 illustrated in FIGS. 1 to 3 includes a plurality of battery cells 1 each having a rectangular outer shape, separator 2 sandwiched between the plurality of battery cells 1 so as to insulate battery cells 1, battery assembly 9 in which battery cells 1 insulated by separator 2 are stacked so that main surfaces 1X thereof face each other, end plates 4 disposed on both respective ends of battery assembly 9, and bind bars 5 that connect end plates 4 at the respective ends.

(Battery Cell 1)

Battery cell 1 is a lithium-ion secondary battery with wide main surface 1X having a rectangular outer shape, and has a thickness smaller than the width of main surface 1X. However, in the power supply device according to the present invention, battery cell 1 is not limited to the lithium-ion secondary battery. As battery cell 1, any other batteries that are currently used or will be developed in the future can also be used, such as a non-aqueous electrolyte secondary battery or a nickel-hydrogen battery cell other than the lithium ion secondary battery.

Battery cell 1 is configured such that exterior can 11 made of a metal in which an electrode assembly (not illustrated) formed by stacking positive and negative electrode plates is stored is filled with an electrolyte, and is sealed in an airtight manner. Exterior can 11 is a columnar shape having a closed bottom, and an upper opening thereof is closed in an airtight manner by a sealing plate formed from a metal plate. Exterior can 11 is formed by deep-drawing a metal plate made of aluminum, aluminum alloy, or the like.

The sealing plate is formed from a metal plate made of aluminum, aluminum alloy, or the like as in the case of exterior can 11. The sealing plate is inserted into the opening of exterior can 11, and the boundary between an outer periphery of the sealing plate and an inner periphery of exterior can 11 is irradiated with a laser beam to fix the sealing plate to exterior can 11 in an airtight manner by laser welding.

Battery cell 1 is provided with positive and negative electrode terminals 13 fixed on both respective ends of the sealing plate so as to project therefrom. Positive and negative electrode terminals 13 are connected to bus bars (not illustrated) that are metal plates so that battery cells 1 are connected in series. Power supply device 100 in which battery cells 1 are connected in series can increase an output voltage to increase an output. Notably, the power supply device can be configured such that battery cells 1 are connected in parallel and in series.

(Separator 2)

Whole separator 2 is integrally molded by using an insulating material. The insulating material is thermoplastic. Separator 2 made of plastic can be produced at low cost in large quantities while realizing a good insulation property. However, in the present invention, the insulating material for the separator is not limited to plastic. For example, any other moldable insulating materials such as ceramics and paper can also be used. Separator 2 is sandwiched between battery cells 1 that are stacked so that adjacent battery cells 1 are insulated from each other and are placed at fixed positions away from each other.

Separator 2 illustrated in FIGS. 2 to 5 is produced by integrally molding whole separator 2 by using thermoplastic that is an insulating material. Separator 2 illustrated in FIGS. 2 to 5 is molded so that body plate part 20 sandwiched between main surfaces 1X of stacked battery cells 1 and insulating rib parts 21A, 21B, 23 connected to lower edges of body plate part 20 are integral with each other.

Body plate part 20 is provided with a plurality of air blowing grooves 30 that are provided in parallel with each other on both surfaces of body plate part 20 so that air path 6 through which cooling air is blown is created between body plate part 20 and a surface of adjacent battery cell 1. Air blowing grooves 30 extend to both sides of body plate part 20 so that air path 6 opened at both ends thereof is created between body plate part 20 and main surface 1X of battery cell 1. Air for cooling is forcibly blown from a cooling fan (not illustrated) through air path 6 so as to cool a surface of battery cell 1 whose temperature has risen. The cooling fan operates upon detection of a rise in battery temperature and keeps battery cells 1 at a set temperature. Power supply device 100 mounted on a vehicle cools battery cells 1 by forcibly blowing indoor or outdoor air through air path 6 as cooling air.

Figure 4:
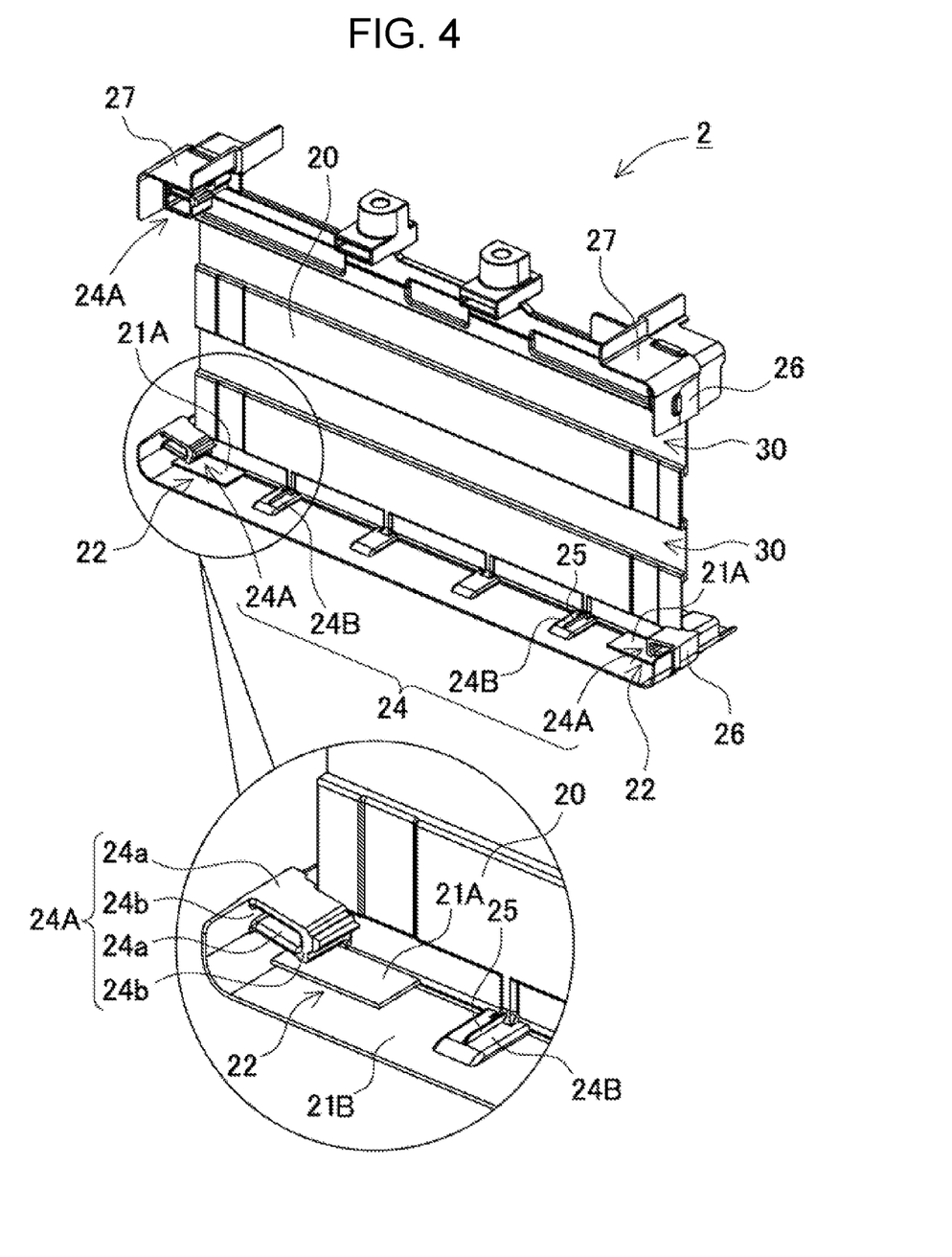
FIG. 4 is a partial enlarged perspective view of a separator.
Figure 5:
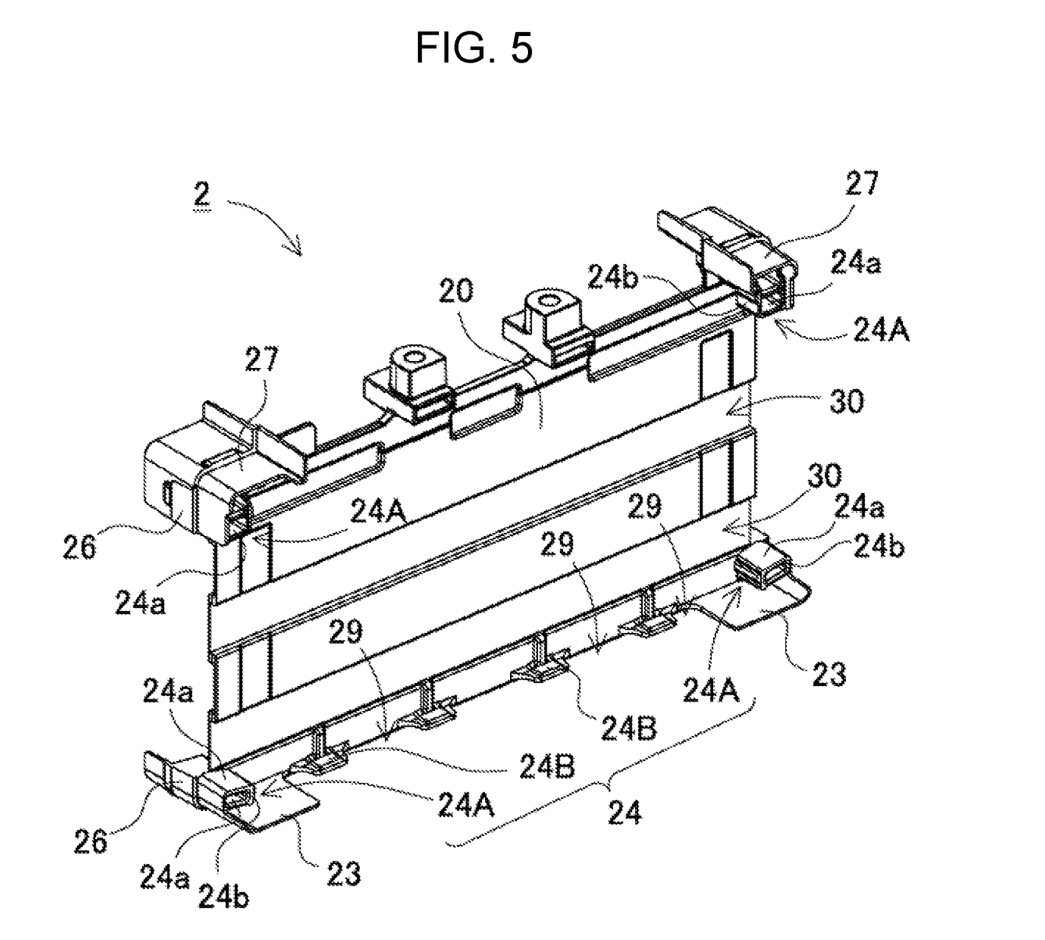
FIG. 5 is a back perspective view of the separator illustrated in FIG. 4.

Insulating rib parts 21A, 21B, 23 protrude from both surfaces of body plate part 20 and are disposed on bottom surfaces 1T of battery cells 1. Power supply device 100 of FIG. 1 is configured such that horizontal plate parts 5A of bind bars 5 made of a metal are disposed below insulating rib parts 21A, 21B, 23 as illustrated in the cross-sectional views of FIGS. 2 and 3. Insulating rib parts 21A, 21B, 23 of power supply device 100 insulate bottom surfaces 1T of battery cells 1 from horizontal plate parts 5A made of a metal. In order to realize this, insulating rib parts 21A, 21B, 23 are disposed on battery cell bottom surfaces 1T. Horizontal plate parts 5A of bind bars 5 are disposed on both sides of battery assembly 9, i.e., both ends of battery cell bottom surfaces 1T, and therefore insulating rib parts 21A, 21B, 23 are provided at least on both ends of lower edge of body plate part 20. Separator 2 illustrated in FIG. 5 is configured such that insulating rib parts 21A, 21B, 23 are provided only at both ends of the lower edge of body plate part 20. Insulating rib parts 21A, 21B, 23 have a horizontal width extending further inward than horizontal plate part 5A in order to insulate battery cell bottom surface 1T from horizontal plate parts 5A made of a metal with certainty. Separator 2 of this structure is provided with water discharge gap 29 between insulating rib parts 21A, 21B, 23 provided at both ends and therefore can promptly discharge dew condensation water on the battery cell bottom parts through water discharge gap 29. Separator 2 illustrated in FIG. 4 is configured such that insulating rib parts 21A, 21B, 23 are provided along the whole lower edges of body plate part 20. These insulating rib parts 21A, 21B, 23 cover almost whole bottom surfaces 1T of battery cells 1 so as to insulate battery cell bottom surfaces 1T from horizontal plate parts 5A of bind bars 5. Note, however, that the separator may be configured such that insulating rib parts protruding from both surfaces of a body plate part are provided only at both ends of lower edges of the body plate part or may be configured such that insulating rib parts protruding from both surfaces of a body plate part are provided along the whole lower edges of the body plate part.

Insulating rib parts 21A, 21B, 23 protruding from both surfaces of body plate parts 20 are stacked on each other on bottom surface 1T of battery cell 1 so as to prolong a creepage distance between battery cell bottom surface 1T and a metal disposed below battery cell bottom surface 1T, specifically, horizontal plate parts 5A made of a metal in illustrated power supply device 100. On bottom surface 1T of battery cell 1, insulating rib parts 21A, 21B, 23 of separators 2 stacked on both surfaces of battery cell 1 are stacked on each other. Each separator 2 illustrated in the cross-sectional views of FIGS. 2 and 6 has, in one of insulating rib parts (hereinafter, also referred to as "first insulating rib part") 21A, 21B, top rib section 21A and bottom rib section 21B overlapping each other to form insertion groove 22 therebetween, and has, in the other of insulating rib parts (hereinafter, also referred to as "second insulating rib part") 23, insertion rib 23 to be inserted into insertion groove 22. Top rib section 21A is closer to bottom surface 1T of battery cell 1 than bottom rib section 21B is to bottom surface 1T of battery cell 1. Insertion rib 23 is inserted into insertion groove 22 so that first insulating rib parts 21A, 21B and second insulating rib part 23 are stacked in a three-layer structure. First insulating rib part 21A, 21B has a U-curved gap on bottom surface 1T of battery cell 1 so as to prolong a creepage distance between battery cell bottom surface 1T and horizontal plate part 5A made of a metal.

Figure 6:
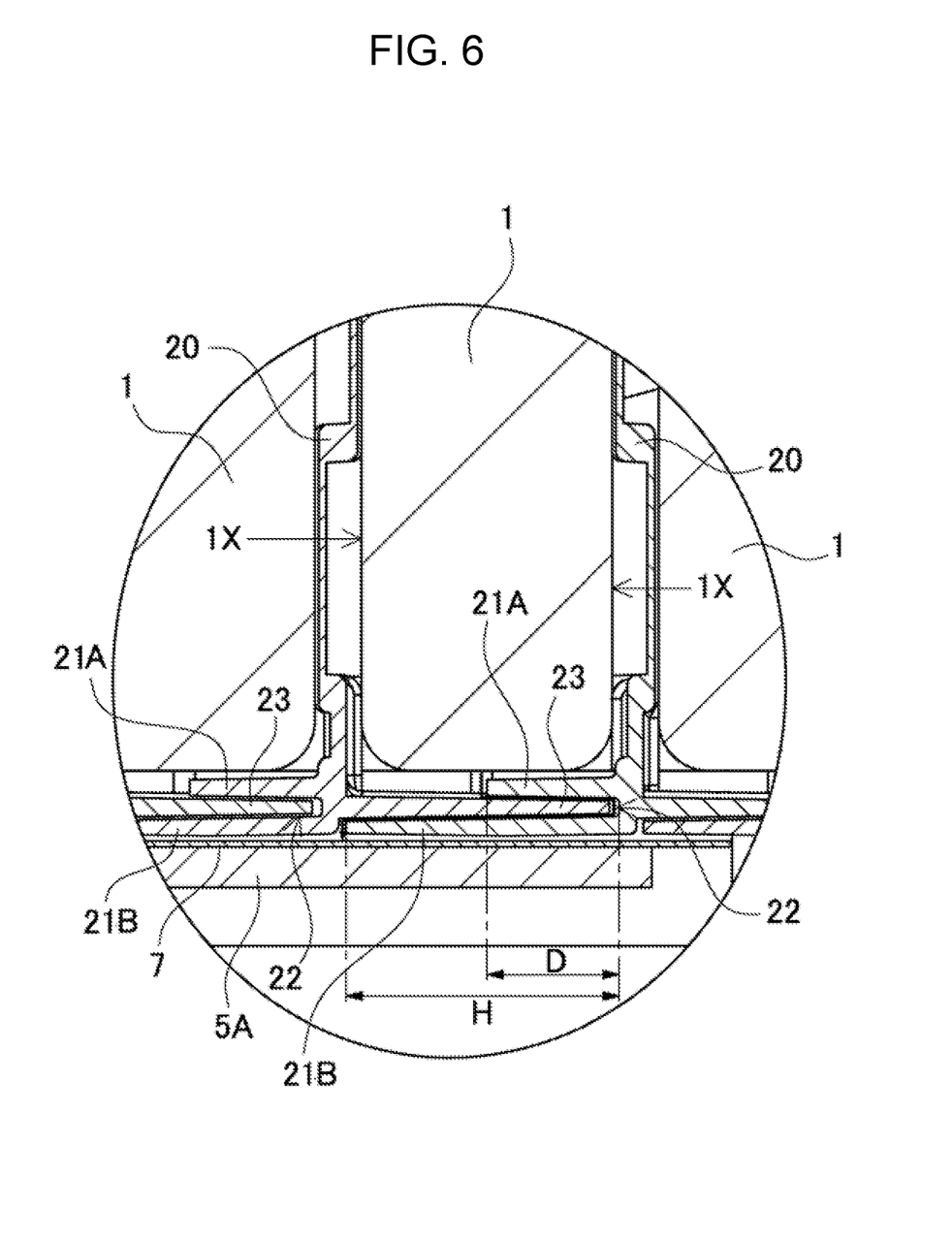
FIG. 6 is an enlarged cross-sectional view illustrating a stacked structure of insulating rib parts of separators.

Power supply device 100 illustrated in the cross-sectional views of FIGS. 2 and 6 is configured such that first insulating rib part 21A, 21B on body plate part 20 of separator 2 stacked on a right side of main surface 1X of battery cell 1 is provided with insertion groove 22 and second insulating rib part 23 connected to body plate part 20 stacked on a left side of main surface 1X of battery cell 1 is provided with insertion rib 23. As illustrated in FIGS. 4 and 5, this separator 2 is provided with insertion groove 22 in first insulating rib part 21A, 21B protruding leftward from a surface of body plate part 20 and is provided with insertion rib 23 in second insulating rib part 23 protruding rightward from a surface of body plate part 20.

The structure in which insertion groove 22 is provided in one of insulating rib parts (i.e., first rib part) 21A, 21B, insertion rib 23 is provided in the other of insulating rib parts (i.e., second rib part) 23, and insulating rib parts 21A, 21B, 23 are stacked on each other by inserting insertion rib 23 into insertion groove 22 can prolong a creepage distance while first and second insulating rib parts 21A, 21B, 23 are linked at fixed positions since a water path created in a gap between insulating rib parts 21A, 21B, 23 is U-curved. In particular, insulating rib parts 21A, 21B, 23 having this structure can further prolong a creepage distance by making insertion groove 22 deeper and making insertion rib 23 longer and thereby prolonging a distance over which insertion rib 23 is inserted into insertion groove 22. Each separator 2 of FIG. 6 has length (H) of bottom rib section 21B longer than length (D) of top rib section 21A in a stacking direction in which the plurality of battery cells are stacked, so as to obtain a long creepage distance since depth of insertion groove 22, defined by length (D) of top rib section 21A, is deep, specifically, approximately ½ of maximum width of first insulating rib part 21A, 21B, defined by length (H) of bottom rib section 21B. Furthermore, the structure in which insertion rib 23 is inserted into insertion groove 22 allows insertion rib 23 to be inserted into insertion groove 22 in a state where a gap between an inner surface of insertion groove 22 and insertion rib 23 is remarkably narrow, specifically, in a state where the inner surface of insertion groove 22 and insertion rib 23 are in close contact with each other with substantially no gap therebetween, thereby making a water film flowing into this gap extremely thin. Therefore, even if dew condensation water enters this gap, insulation resistance caused by the dew condensation water can be made considerably large. In insulating rib parts 21A, 21B, 23 configured such that insertion rib 23 is inserted into insertion groove 22, depth of insertion groove 22, defined by length (D) of top rib section 21A, is preferably set to ¼ or more of maximum width of first insulating rib part 21A, 21B, defined by length (H) of bottom rib section 21B, more preferably set to ⅓ or more of maximum width of first insulating rib part 21A, 21B, defined by length (H) of bottom rib section 21B, in order to prolong a creepage distance.

In FIG. 6, a gap between the inner surface of insertion groove 22 and insertion rib 23 is exaggerated for easy understanding of a stacked structure of insulating rib parts 21. Actually, the inner surface of insertion groove 22 and insertion rib 23 are in close contact with each other with substantially no gap therebetween as described earlier. The expression "stacked insulating rib parts 21A, 21B, 23 (e.g., the inner surface of insertion groove 22 and insertion rib 23) are in close contact with each other with no gap therebetween" as used herein refers to a state where insulating rib parts 21A, 21B, 23 are close to each other to a degree such that water does not pass therebetween, and a gap through which air can pass may be present therebetween.

Furthermore, separator 2 is molded integrally with position determining ribs 24 that protrude from both surfaces of body plate part 20 and place battery cell 1 at a fixed position. Separator 2 of FIGS. 3 to 5 has position determining rib 24 at four corners and along lower edges of body plate part 20. Battery cell 1 is disposed at a fixed position by being fitted on inner sides of position determining ribs 24. Battery cell 1 is prevented from being displaced in a left-right direction by being disposed between position determining ribs 24 provided on both sides of body plate part 20 and is prevented from being displaced in an up-down direction by being disposed between position determining ribs 24 provided in upper and lower parts of body plate part 20.

Separator 2 of FIGS. 3 to 5 has end position determining ribs 24A on respective sides of a lower part of body plate part 20 and has a plurality of intermediate position determining ribs 24B between end position determining ribs 24A. Separator 2 illustrated in FIG. 5 is provided with insulating rib parts 21A, 21B, 23 only at both respective ends of the lower edge of body plate part 20, and the plurality of intermediate position determining ribs 24B are provided between insulating rib parts 21A, 21B, 23 provided at both respective ends so as to protrude from the lower edge of body plate part 20. Water discharge gap 29 through which dew condensation water is discharged is provided between intermediate position determining ribs 24B.

In order to prevent horizontal displacement of battery cell 1 with certainty, each end position determining rib 24A is configured such that two horizontal ribs 24a extending in a horizontal direction are provided away from each other in an up-down direction and are linked by vertical rib 24b and deformed rib 25 is provided so as to protrude from a surface of vertical rib 24b. As illustrated in FIGS. 3 to 5, each end position determining rib 24A provided on both sides of the lower part of body plate part 20 is configured such that an upper surface of upper horizontal rib 24a is inclined downward toward a central part. Even in a case where dew condensation water drops from a battery cell surface onto the upper surface of this position determining rib 24, the dew condensation water smoothly flows on the upper surface and therefore can be discharged without remaining on the upper surface. Separator 2 of FIGS. 3 to 5 is also provided with water discharge gap 29 between insulating rib part 21A, 21B,_23 and position determining rib 24 and thereby allows dew condensation water to be promptly discharged through this gap.

A dimensional error occurs in outer shape of battery cell 1 in a production process. Each position determining rib 24 is molded integrally with narrow deformed rib 25 that protrudes from a contact surface with outer peripheral surface 1R of battery cell 1 and is deformed by being pressed against outer peripheral surface 1R of battery cell 1 in order to place battery cell 1 having a dimensional error in height and horizontal width of main surface 1X at a fixed position so as to be sandwiched between upper, lower, left, and right position determining ribs 24.

Figure 7:
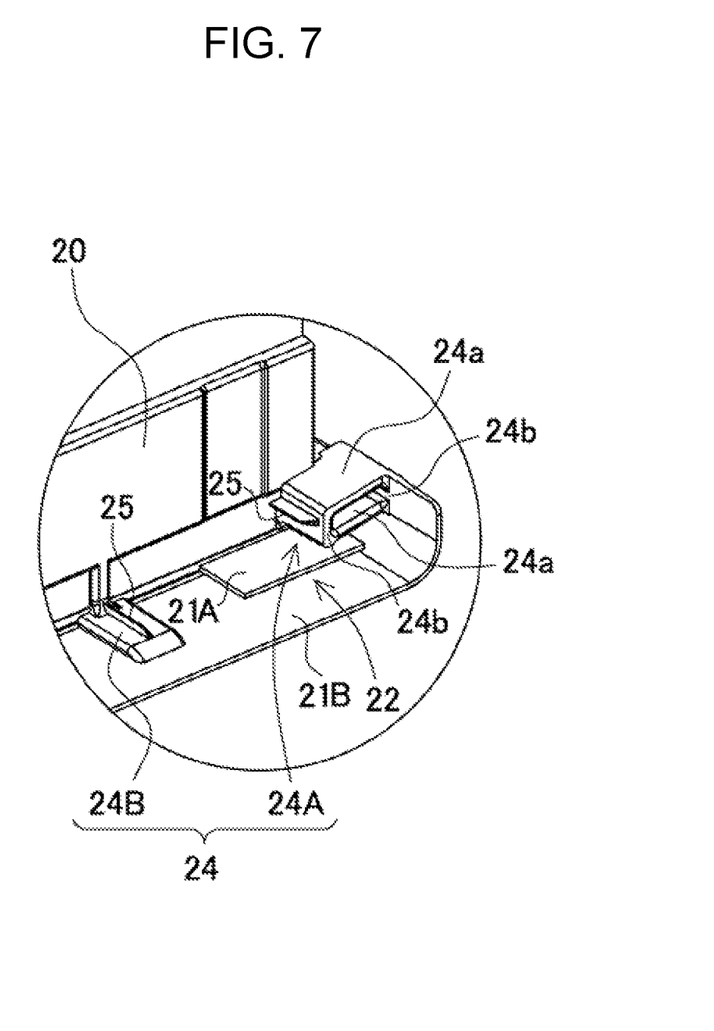
FIG. 7 is a substantial-part enlarged perspective view illustrating a deformed rib of the separator.

Deformed rib 25 is illustrated in the cross-sectional view of FIG. 2 and the enlarged perspective view of FIG. 7. Deformed rib 25 illustrated in FIGS. 2 and 7 is a narrow ridge-shaped protruded strip deformed by being pressed against outer peripheral surface 1R of battery cell 1. In order to place battery cell 1 having a minimum dimension at a fixed position by pressing outer peripheral surface 1R of battery cell 1, a front edge of the ridge-shaped protruded strip of deformed rib 25 is disposed so as to make contact with battery cell 1 having a minimum dimension. In a case where battery cell 1 larger than the minimum dimension is disposed between position determining ribs 24, deformed rib 25 is deformed by being pressed against outer peripheral surface 1R of battery cell 1 and holds battery cell 1 at a fixed position so that battery cell 1 is not displaced by sandwiching battery cell 1 from upper, lower, left and right sides.

As illustrated in the cross-sectional view of FIG. 2, deformed ribs 25 provided on upper surfaces of the plurality of intermediate position determining ribs 24B that are provided along a lower edge of body plate part 20 and hold bottom surface 1T of battery cell 1 extend to the lower edge part of body plate part 20. These deformed ribs 25 make contact with battery cell bottom surface 1T. Accordingly, these deformed ribs 25 are deformed by being pressed against bottom surface 1T of battery cell 1 and hold battery cell 1 at a fixed position so that battery cell 1 is not displaced in an up-down direction.

(End Plate 4)

End plates 4 are plates that are disposed at respective ends of battery assembly 9 and have a strength that can pressurize and fix battery cells 1 in a stacking direction and are connected to bind bars 5 so as to fix battery cells 1 in a pressurized state. Power supply device 100 illustrated in FIG. 2 is configured such that separator 2X is disposed between end plate 4 made of a metal and battery assembly 9. Separator 2X sandwiched between end plate 4 and battery assembly 9 has insulating rib parts 21A, 21B, 23 and position determining ribs only on a single surface of body plate part 20X, i.e., only on a surface of body plate part 20X that faces battery assembly 9.

(Bind Bar 5)

As illustrated in FIG. 1, both ends of bind bars 5 are connected to end plates 4, and bind bars 5 bind battery assembly 9 by way of end plates 4. Bind bars 5 are produced by pressing metal plates. Metal plates made of a metal such as iron, preferably steel plates, can be used for bind bars 5. Bind bars 5 illustrated in FIGS. 1 and 8 each have side surface plate part 5X disposed on a side surface of battery assembly 9 and fixed parts 5C located at respective ends of side surface plate part 5X, disposed on outer end faces of end plates 4, and fixed to end plates 4 by using fasteners 19. Lower edges of side surface plate parts 5X are bent inward so as to constitute horizontal plate parts 5A that support both sides of a bottom surface of battery assembly 9, i.e., both ends of battery cell bottom surface 1T. Each horizontal plate parts 5A made of a metal is insulated from battery cell 1 by insulating rib parts 21A, 21B, 23 interposed between horizontal plate part 5A and battery cell bottom surface 1T.

Figure 8:
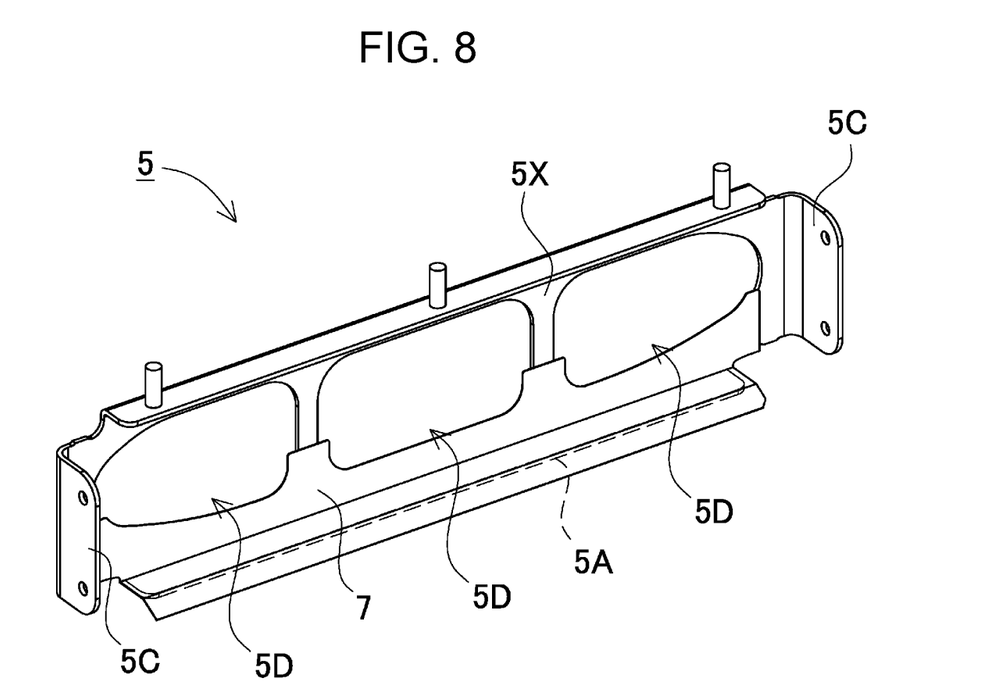
FIG. 8 is a perspective view of a bind bar.

Insulating sheet 7 is disposed between insulating rib parts 21A, 21B, 23 and bind bar 5 in order to further improve insulation properties between bind bar 5 made of a metal and battery cell 1. An inner surface of bind bar 5 illustrated in FIG. 8 is insulated by attaching insulating sheet 7 onto the inner surface. Insulating sheet 7 attached onto bind bar 5 has a width extending from an inner surface of horizontal plate part 5A to a lower part of side surface plate part 5X. Insulating sheet 7 attached onto the inner surface of horizontal plate part 5A has a horizontal width that protrudes further inward from an inner edge of horizontal plate part 5A and covers and insulates an entire surface of horizontal plate part 5A. The structure in which insulating sheet 7 is attached onto bind bar 5 allows insulating sheet 7 to be placed at a fixed position so that insulating sheet 7 is not displaced, thereby insulating the inner surface of bind bar 5 with more certainty. Since insulating sheet 7 is attached onto the lower part of bind bar 5, bind bar 5 can effectively prevent a decrease in insulation resistance caused by dew condensation water dropping from a surface of battery cell 1 onto the lower part. Especially in battery cell 1 in which a surface of exterior can 11 is not covered with a heat shrinkable tube made of an insulating material, exterior can 11 made of a metal and bind bar 5 can be insulated from each other with more certainty.

In addition, bind bar 5 made of a metal is provided with air blowing openings 5D in inner parts of side surface plate part 5X except for an outer perimeter part of side surface plate part 5X so that cooling air can be blown into air paths 6 of battery assembly 9. Side surface plate part 5X of bind bar 5 made of a metal is disposed away from side surfaces 1S of battery cells 1, is insulated from exterior cans 11 of battery cells 1, and is provided with air blowing gap 28 for cooling air. In order to realize this, separator 2 of FIG. 3 is configured such that battery cell 1 is disposed on an inner side of end position determining rib 24A provided on both sides of body plate part 20 and bind bar 5 is disposed on an outer side of this position determining rib 24. In order to place bind bar 5 at a fixed position, separator 2 is molded integrally with vertical walls 26 that are provided at four corners of body plate part 20 and protrude from side surface 1S of body plate part 20.

Each vertical wall 26 of separator 2 of FIGS. 3 to 5 is molded in a shape connecting vertical rib 24b of end position determining rib 24A and insulating rib part 21A, 21B, 23. Vertical wall 26 provided on the lower part of body plate part 20 is configured such that an upper edge of vertical wall 26 is connected to upper horizontal rib 24a of end position determining rib 24A and a lower edge of vertical wall 26 is connected to an outer-side edge of insulating rib part 21A, 21B, 23. Vertical wall 26 provided on the upper part of body plate part 20 is configured such that a lower edge of vertical wall 26 is connected to lower horizontal rib 24a of end position determining rib 24A and an upper edge of vertical wall 26 to horizontal wall 27 provided on an upper edge of body plate part 20. Vertical walls 26 having this structure improve bending strength in a horizontal direction due to ribs extending in a horizontal direction and therefore allows bind bar 5 to be placed on outer sides of vertical walls 26 without being displaced. Bind bar 5 is disposed in contact with the outer sides of vertical walls 26 so as to be disposed outside both side edges of body plate part 20 of separator 2.

Outer peripheral surface 1R on both sides of battery cell 1 is disposed on an inner side relative to both side edges of separator 2 and is therefore disposed away from side surface plate part 5X of bind bar 5. Since bind bar 5 is disposed on an outer side of both side edges of separator 2, power supply device 100 in which this separator 2 is provided between battery cells 1 is configured such that a gap is provided between side surface plate part 5X of bind bar 5 and outer peripheral surface 1R on both sides of battery cell 1. This can insulate side surface 1S on both sides of battery cell 1 from bind bar 5 made of a metal and can provide air blowing gap 28. In this power supply device 100, battery cell 1 is insulated from bind bar 5 by providing a gap between bind bar 5 and battery cell 1, and the lower part of side surface plate part 5X is covered with insulating sheet 7 so that a decrease in insulation resistance caused by dew condensation water is prevented.

The exemplary embodiment of the present invention has been described with reference to the drawings. The exemplary embodiment is merely preferable illustration for embodying the technical ideas of the present invention. The present invention is not limited to the above exemplary embodiment. Further, in the present description, components shown in the scope of claims are not limited to the components of the exemplary embodiment. In particular, it is not intended to limit the sizes, materials, and shapes of components and relative arrangement between the components, which are described in the exemplary embodiment, to the scope of the present invention unless otherwise specified. The sizes and the like are mere explanation examples. However, the sizes and the positional relation of the components in each drawing are exaggerated for clearing the explanation in some cases.

INDUSTRIAL APPLICABILITY

The power supply device according to the present invention is optimally used for a power supply device that supplies power to a motor of a vehicle which requires large power or a power storage device that stores natural energy or night power.

The invention claimed is:

1. A power supply device comprising:
a plurality of battery cells each having a rectangular outer shape thinner than a width of a main surface;
a plurality of separators, each respectively being disposed between adjacent battery cells of the plurality of battery cells and being a molded member made of an insulating material;
a pair of end plates that are disposed on both ends of a battery assembly in which the plurality of battery cells insulated by the plurality of separators are stacked so that the main surfaces face each other; and
a bind bar that binds the pair of end plates,
wherein each of the plurality of separators has insulating rib parts that protrude from respective surfaces of the separator so as to overlap, in an up-down direction perpendicular to the stacking direction, bottom surfaces of the adjacent battery cells of the plurality of battery cells between which the respective separator is disposed, and
wherein two of the plurality of separators which are adjacent to each other via one of the plurality of battery cells have respective insulating rib parts stacked directly on each other while overlapping a bottom surface of the one of the plurality of battery cells in the up-down direction,
wherein the stacked insulating rib parts include a first insulting rib part and a second insulating rib part,
the first insulting rib part has a top rib section and a bottom rib section overlapping each other to form an insertion groove therebetween, wherein the top rib section is closer to the bottom surface of the one of the plurality of battery cells than the bottom rib section is to the bottom surface of the one of the plurality of battery cells,
the second insulting rib part has an insertion rib to be inserted into the insertion groove, and
the top rib section, the insertion rib, and the bottom rib section are stacked directly on each other while overlapping the bottom surface of the one of the plurality of battery cells in the up-down direction by inserting the insertion rib into the insertion groove so that a creepage distance is U-curved,
wherein a length (H) of the bottom rib section is longer than a length (D) of the top rib section in a stacking direction in which the plurality of battery cells are stacked.

2. The power supply device according to claim 1, wherein
the bind bar is a metal plate, and the bind bar made of a metal has a horizontal plate part disposed on lower surfaces of the insulating rib parts; and
an insulating sheet is disposed between the horizontal plate part and the insulating rib parts, and the insulating sheet insulates the horizontal plate part made of the metal from the insulating rib parts.

3. The power supply device according to claim 2, wherein
the bind bar has a side surface plate that is connected to the horizontal plate part and is disposed on a side surface of at least one of the plurality of battery cells; and
the insulating sheet is continuously disposed at least on a surface of a bottom part of the side surface plate and a surface of the horizontal plate part.

4. The power supply device according to claim 1, wherein
at least one of the plurality of separators has position determining ribs that protrude from two opposite side portions of the separator so as to make contact with side surfaces of a corresponding one of the plurality of battery cells adjacent thereto and place the corresponding one of the plurality of battery cells at a fixed position; and
the position determining ribs each have an upper surface that is inclined downward from a corresponding one of the two opposite side portions of the separator toward a corresponding one of the side surfaces of the corresponding one of the plurality of battery cells.

5. The power supply device according to claim 1, wherein
the bind bar is a metal plate, and the bind bar has a horizontal plate part disposed on lower surfaces of the insulating rib parts;
the insulating rib parts of at least one of the plurality of separators include two insulating rib parts that are respectively located at two opposite ends of the separator, while being disposed between the horizontal plate part of the bind bar and the bottom surface of a corresponding one of the plurality of battery cells adjacent thereto;
the at least one of the plurality of separators has, between the two insulating rib parts, a position determining rib that protrudes from one of the respective surfaces of the separator so as to make contact with the bottom surface of the corresponding one of the plurality of battery cells and place the corresponding one of the plurality of battery cells at a fixed position; and
a water discharge gap is provided between the two insulating rib parts and the position determining rib.

6. The power supply device according to claim 5, wherein
the at least one of the plurality of separators has a plurality of the position determining ribs between the two insulating rib parts, and a water discharge gap is provided between the position determining ribs.

7. The power supply device according to claim 1, wherein
at least one of the plurality of separators has a position determining rib that makes contact with an outer peripheral surface of a corresponding one of the plurality of battery cells adjacent thereto and places the corresponding one of the plurality of battery cells adjacent thereto at a fixed position; and
a deformed rib that is deformed by being pressed against the outer peripheral surface of the corresponding one of the plurality of battery cells adjacent thereto is provided on a contact surface of the position determining rib with the outer peripheral surface of the corresponding one of the plurality of battery cells adjacent thereto.

8. The power supply device according to claim 1, wherein
an air path is provided between at least one of the plurality of separators and a corresponding one of the plurality of battery cells adjacent thereto.

9. The power supply device according to claim 1, wherein
the plurality of battery cells each have an exterior can made of a metal, and the plurality of separators are respectively disposed between the plurality of battery cells in each of which a surface metal of the respective exterior can is exposed.

10. The power supply device according to claim 1, wherein
the length (D) of the top rib section is from ¼ to ½ the length (H) of the bottom rib section in the stacking direction in which the plurality of battery cells are stacked.

11. The power supply device according to claim 1, wherein
wherein a length of the insertion rib is the same as the length (H) as the bottom rib section in the stacking direction in which the plurality of battery cells are stacked.

* * * * *